United States Patent
Elgarat

(10) Patent No.: US 9,449,292 B1
(45) Date of Patent: Sep. 20, 2016

(54) SYSTEM, METHOD, AND COMPUTER PROGRAM FOR AUTOMATIC HIGH LEVEL TESTING PROJECT PLANNING

(71) Applicant: Amdocs Software Systems Limited, Dublin (IE)

(72) Inventor: Sharon Elgarat, Kibbutz Mefalsim (IL)

(73) Assignee: Amdocs Software Systems Limited, Dublin (IE)

(*) Notice: Subject to any disclaimer, the term of this patent is extended or adjusted under 35 U.S.C. 154(b) by 0 days.

(21) Appl. No.: 14/599,289

(22) Filed: Jan. 16, 2015

(51) Int. Cl.
G06F 9/44 (2006.01)
G06Q 10/06 (2012.01)

(52) U.S. Cl.
CPC .................. G06Q 10/06 (2013.01)

(58) Field of Classification Search
CPC .................................. G06Q 10/06
USPC ................................ 717/101
See application file for complete search history.

(56) References Cited

U.S. PATENT DOCUMENTS

| | | | |
|---|---|---|---|
| 5,924,072 A | 7/1999 | Havens | |
| 6,381,604 B1* | 4/2002 | Caughran | G06Q 10/10 |
| 6,546,506 B1* | 4/2003 | Lewis | G06Q 10/06 |
| | | | 714/38.1 |
| 8,438,545 B1* | 5/2013 | Almog | G06F 11/3692 |
| | | | 717/126 |
| 8,589,196 B2 | 11/2013 | Grace et al. | |
| 9,122,799 B1* | 9/2015 | Elgarat | G06F 11/3664 |
| 2006/0089849 A1* | 4/2006 | Irby | G06Q 30/00 |
| | | | 705/400 |
| 2008/0052690 A1* | 2/2008 | Bharadwaj | G06F 11/3696 |
| | | | 717/140 |
| 2008/0263505 A1* | 10/2008 | StClair | G06F 8/10 |
| | | | 717/101 |
| 2009/0192836 A1* | 7/2009 | Kelly | G06Q 30/0203 |
| | | | 705/7.32 |
| 2010/0131497 A1* | 5/2010 | Peterson | G06Q 10/06 |
| | | | 707/722 |
| 2011/0066486 A1* | 3/2011 | Bassin | G06Q 10/00 |
| | | | 704/14.43 |
| 2011/0066490 A1* | 3/2011 | Bassin | G06Q 10/06 |
| | | | 705/14.48 |
| 2011/0066890 A1* | 3/2011 | Bassin | G06F 11/3672 |
| | | | 714/37 |
| 2011/0088014 A1* | 4/2011 | Becker | G06Q 10/06 |
| | | | 717/125 |
| 2012/0060144 A1* | 3/2012 | Novak | G06Q 10/06 |
| | | | 717/105 |
| 2012/0224057 A1* | 9/2012 | Gill | G06F 21/55 |
| | | | 348/143 |

* cited by examiner

Primary Examiner — Lewis A Bullock, Jr.
Assistant Examiner — Theodore Hebert
(74) Attorney, Agent, or Firm — Zilka-Kotab, PC

(57) ABSTRACT

A system, method, and computer program product are provided for automatic high level testing project planning. In use, information associated with at least one testing project to be planned is received, the information including a plurality of project attributes associated with the at least one testing project. Additionally, one or more test planning rules are identified based on the received information, the one or more rules including rules generated utilizing data associated with a plurality of previously performed testing projects. Further, one or more test planning conclusions applicable for the at least one testing project are determined based on the one or more test planning rules and the received information. Moreover, the one or more test planning conclusions are output utilizing at least one user interface.

13 Claims, 4 Drawing Sheets

SYSTEM, METHOD, AND COMPUTER PROGRAM FOR AUTOMATIC HIGH LEVEL TESTING PROJECT PLANNING

FIELD OF THE INVENTION

The present invention relates to software testing projects, and more particularly to efficiently generating effective software testing plans.

BACKGROUND

The testing of software is a critical step in the software development lifecycle. The objective of the testing is to verify and validate the integration of the software, the hardware and the configuration thereof, and to prevent malfunction of the software when in use.

Crucial steps to avoiding inefficiencies in software testing include developing and managing effective test plans. Test planning is a stage in all testing projects where test managers prepare the project and organize in deliverable documents the strategy, resources, travels, and overall project plan for all activities needed in the project. Current techniques for planning testing projects fail to provide an efficient automated approach to test planning.

There is thus a need for addressing these and/or other issues associated with the prior art.

SUMMARY

A system, method, and computer program product are provided for automatic high level testing project planning. In use, information associated with at least one testing project to be planned is received, the information including a plurality of project attributes associated with the at least one testing project. Additionally, one or more test planning rules are identified based on the received information, the one or more rules including rules generated utilizing data associated with a plurality of previously performed testing projects. Further, one or more test planning conclusions applicable for the at least one testing project are determined based on the one or more test planning rules and the received information. Moreover, the one or more test planning conclusions are output utilizing at least one user interface.

DETAILED DESCRIPTION

Figure 1:
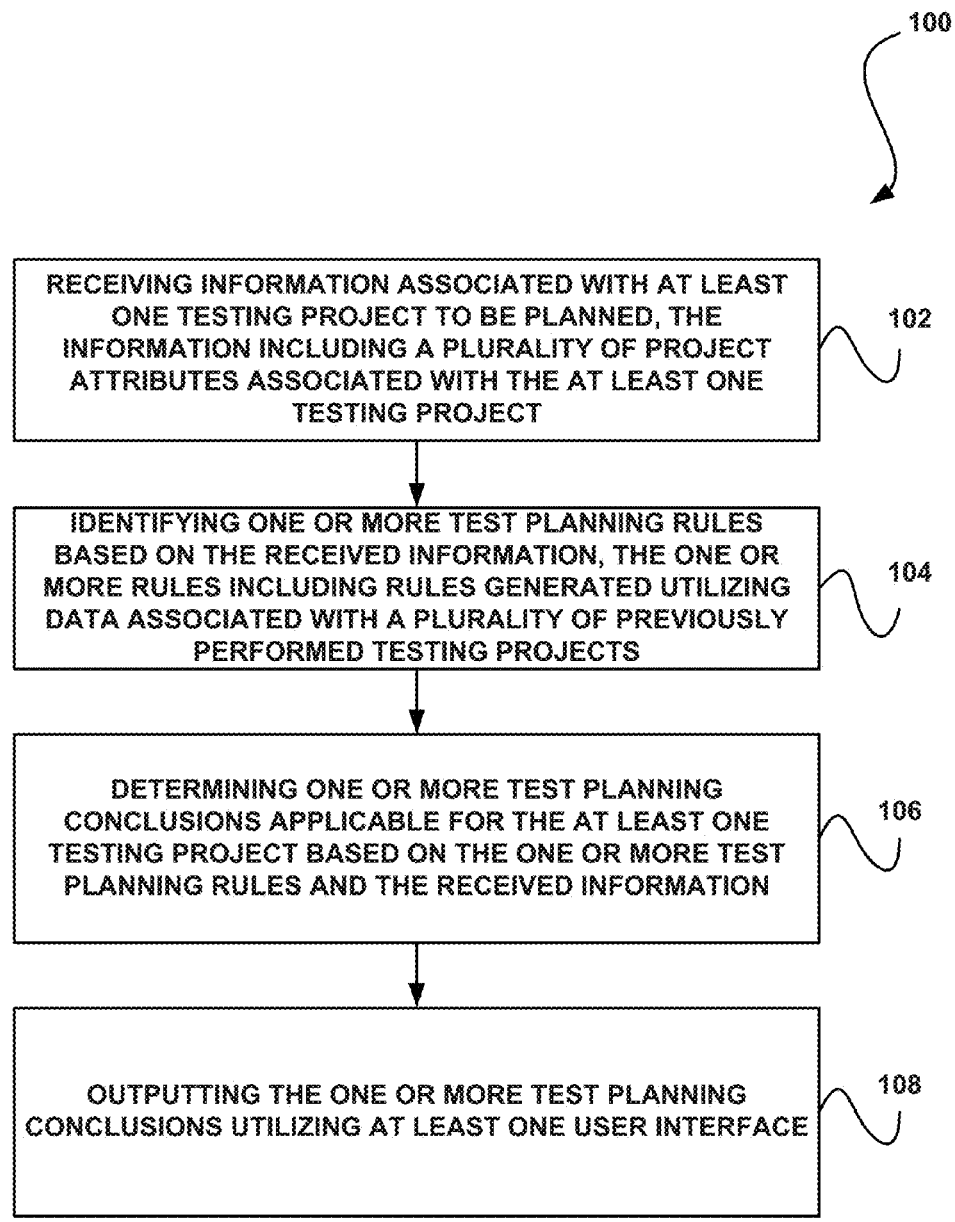
FIG. 1 illustrates a method for automatic high level testing project planning, in accordance with one embodiment.

FIG. 1 illustrates a method 100 for automatic high level testing project planning, in accordance with one embodiment.

As shown, information associated with at least one testing project to be planned is received. See operation 102. The information includes a plurality of project attributes associated with the at least one testing project.

The testing project may include any type of software testing project and may be a portion of a larger testing project or an entire project. Moreover, the testing project may be associated with any industry, such as the telecommunications industry, etc.

The information received may include any number of attributes, parameters, metadata, and/or other data associated with the testing project. For example, the project attributes associated with the at least one testing project may include a project type, a testing methodology, a testing start date, a production date, a customer region, a main language, and/or a prime vendor, etc. In one embodiment, the project attributes may be received by a user inputting the information using a user interface.

With further reference to FIG. 1, one or more test planning rules are identified based on the received information. See operation 104. The one or more rules include rules generated utilizing data associated with a plurality of previously performed testing projects.

The rules may include any number of rules that are generated and constantly maintained based on best practices and lessons learned from a plurality of testing projects and personnel associated therewith (e.g. test managers, etc.). The rules may be generated and maintained based on data and feedback associated with ongoing projects or historical information from previous projects. The information used to generate the rules may include any and all information obtained across one or more organizations.

Further, one or more test planning conclusions applicable for the at least one testing project are determined based on the one or more test planning rules and the received information. See operation 106. The test planning conclusions may include any recommendation, instruction, or conclusion generated based on the rules (and how they apply to the project data, etc.).

For example, the test planning conclusions may include an indication of a number of test environments required for the testing project. As another example, the test planning conclusions may include an indication of an amount of effort that should be allocated to test design of the testing project. As another example, the test planning conclusions may include an indication of how quickly to ramp up testers and a number of ramp up steps associated with the testing project.

As yet another example, the test planning conclusions may include an indication of testing types that the testing project must include. As another example, the test planning conclusions may help define a path of instructions to complete the testing project.

Moreover, the one or more test planning conclusions are output utilizing at least one user interface. See operation 108.

In one embodiment, outputting the test planning conclusions utilizing the user interface may include presenting the test planning conclusions in an overall overview user interface or screen. Additionally, in one embodiment, outputting the test planning conclusions utilizing the user interface may include presenting a specific test planning conclusion corresponding to a current step of the testing project.

Still yet, in one embodiment, outputting the test planning conclusions utilizing the user interface may include presenting the test planning conclusions as a guided workflow that follows a progress of the testing project. In another embodiment, outputting the test planning conclusions may include outputting information associated with one or more predefined test sets.

Additionally, in one embodiment, the method 100 may include utilizing the test planning conclusions to populate one or more deliverable documents with specific information for the testing project. The deliverable documents may include any number of documents, such as documents associated with a strategy of the testing project, resources associated with the testing project, and/or an overall project plan of the testing project, etc.

In one embodiment, lessons learned during the project, related to deliverables, may be communicated back to a user who may constantly enhance the rules. For example, the method 100 may further include receiving additional information associated with the testing project; identifying one or more additional test planning rules based on the received additional information; and determining one or more new test planning conclusions applicable for the testing project based on the additional test planning rules and the received additional information.

Thus, the method 100 may be implemented for automatically providing test managers with insight into their own projects, associated strategies, project plans, readymade automation test sets, and various other deliverables the test managers must produce as part of the planning stage of the project. The method 100 may employ a rules based decision making mechanism to deduce test planning conclusions. The rules may be generated and constantly maintained based on best practices and lessons learned from all testing projects within an organization.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
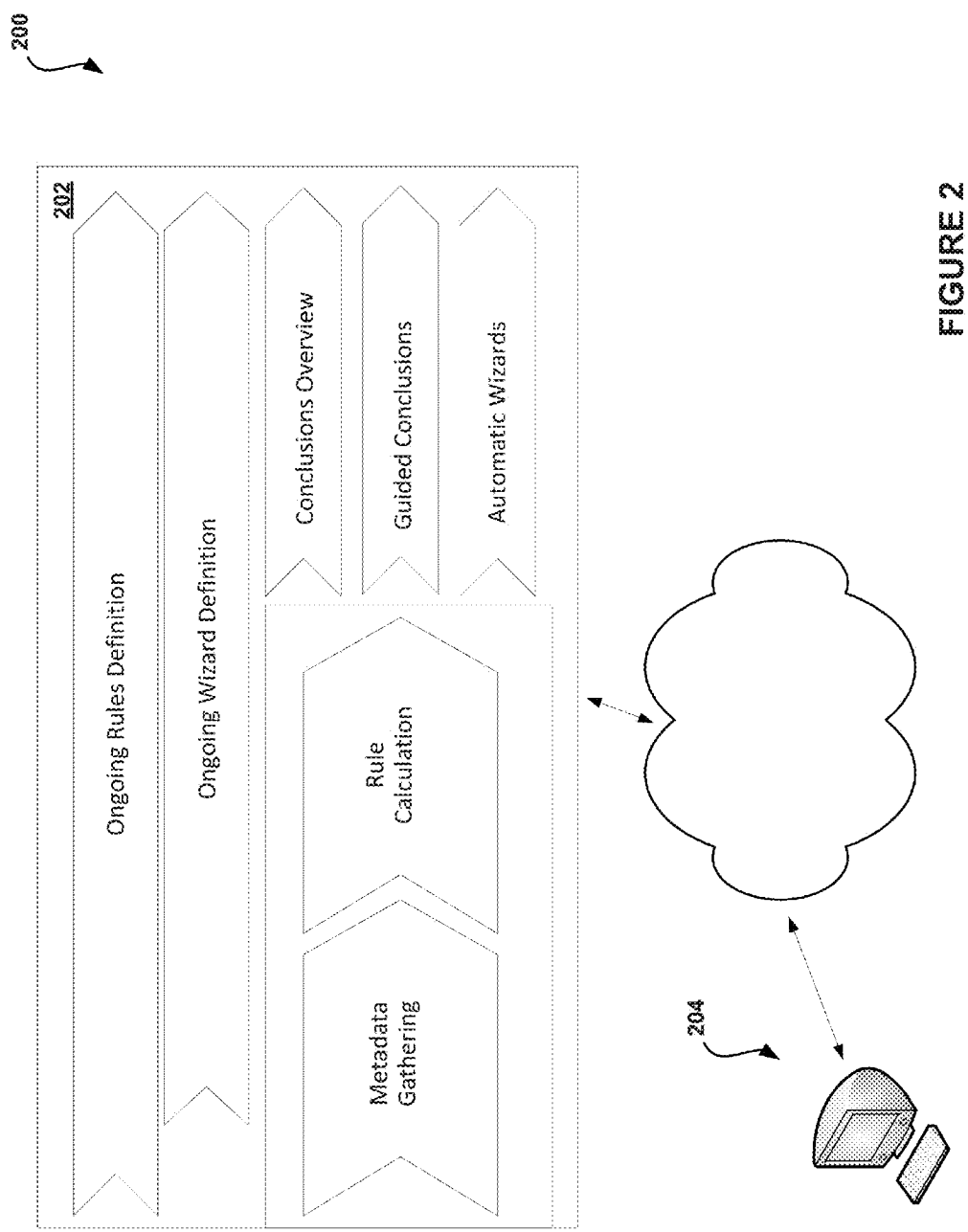
FIG. 2 illustrates a system flow for automatic high level testing project planning, in accordance with one embodiment.

FIG. 2 illustrates a system 200 for automatic high level testing project planning, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, the system 200 includes a test planning system 204 and a testing software platform 202 that may be accessed over one or more networks or may be stored locally by the test planning system 204.

The system 200 may be utilized for automatically providing test managers with insight into their own projects, associated strategies, project plans, premade automation test sets, and various other deliverables the test managers must produce as part of the planning stage of the project. This system 200 uses a rules based decision making mechanism to deduce test planning conclusions. The rules may be generated and constantly maintained based on best practices and lessons learned from all testing projects within an organization.

Project metadata gathered within the system 200 may be used as input for the rules to determine the appropriate conclusion. The conclusions calculated for the specific project may be presented in one overall overview page (i.e. user interface screen) for the test manager to study. Alternatively, the system 200 may present the test manager with a view of a specific conclusion related to the exact step on which the test manager is currently working. The system 200 may do this using a guided process that follows progress within the project's management activities.

Outputs of the rules may be used by wizards within the system 200 that populate deliverable documents with specific information for the project, on top of a generic best practice template, to bring a document to a ~90% ready state. Rules may also point to readymade automation test sets to help the test manager reuse existing tests that are relevant for the project and that can reduce the work effort dramatically while increasing the quality of tests.

The system 200 may function to provide a project manager specific insight from best practice wisdom to test managers. The system 200 may also be utilized to set a standard for test project planning and to facilitate the implementation. Additionally, the system 200 may function to shorten the time required to provide the customer test strategy and supporting documents.

The system 200 may also function to give the test manager relevant data from a top down view at each relevant step in a project Moreover, the system 200 may function to produce test planning deliverables with specific account information and to provide access to readymade automated test sets that are relevant for the project that can dramatically reduce design effort.

Test planning is a stage in all testing projects where managers prepare the project and organize in deliverable documents the strategy, resources, travels and overall project plan for all activities needed in the project. The system 200 is used for test management guidelines. Some existing capabilities allow collecting project base parameters and defining a path of instructions the manager must go through to complete a project with success. In order to automate elements within the test planning process, the system 200 provides the software platform 202 that allows for ongoing rules definition, ongoing wizard definition, project creation including metadata gathering and rules calculation, conclusions overview, guided conclusions, and automatic wizards.

With respect to ongoing rules definition, administrators of the system 200 may define rules based on collected lessons learned from across all currently running or already ended testing projects. In this case, each rule may define specific project attributes that must be met for the rule to be applied for a project.

The rules determine a set of test planning conclusions applicable for projects that meet the defined attribute values. Such rules may also carry links to existing automation test sets, which may be reused by the project in the case the rule identifies the automation fits the project's characteristics. The administrator may relate a rule to a specific instruction within the test manager's guided set of instructions that follow the test manager through the activities needed to complete a project.

With respect to ongoing wizard definition, administrators of the system 200 may define wizards for each deliverable the manager has to produce for a customer during the project (e.g. such as estimation, strategy, project plan, resource plan, travel plan, etc.).

The wizard may be defined on top of a predefined template and may make use of both pure metadata elements (e.g. such as project name, account name, etc.) and conclusions coming out of rules to which the project may be applicable (e.g. testing budget, included test types, etc.).

With respect to project creation and metadata gathering for the creation of a project within the system 200, the manager may input general parameters of the project. For example, such parameters may include product, project type, testing methodology, testing start date, production date, conversion type, customer region, main language, and prime SI vendor, etc. These inputs may help classify the project and enable conclusions customized to the needs of the specific project.

With respect to project creation and rules calculation, all rules available within the system 200 may be calculated at the time of the project's creation. The conclusions from the rules may be saved for later use.

Examples of conclusions that the system 200 may determine include: the number of test environments required for the project; the amount of effort that should be allocated to test design; how quickly the project should ramp up testers and the number of ramp up steps; and the testing types that the project must include in its scope. Any changes made in the project's metadata, at any given point, may trigger recalculation of the rules to accommodate conclusions based on the new inputs.

With respect to a conclusions overview, the system 200 may present a dedicated screen or user interface to present all known conclusions based on all rules for which the project was applicable. This provides the test manager with a high level understanding of his project at an extremely early stage in the project planning.

With respect to guided conclusions, within the system 200, a set of guiding instructions may follow the test manager during the flow of activities required for a proper test project management. While editing an instruction for which a rule was determined applicable, the conclusion of the rule may be presented. The manager therefore benefits from the automatic mentoring.

An example of such instructions and related conclusions include instructions (e.g. prepare a data request and send to the customer, etc. and rule conclusions (e.g. request between 200 to 300 physical SIM cards for Postpaid Mobile End to End testing, etc.).

Lessons learned during the project, related to provided conclusions may be communicated back to the administrators as return feedback to constantly enhance the rules with more accurate observations.

With respect to automatic wizards, once the test manager reaches a stage in which a deliverable must be produced for the customer, a wizard (i.e. a computer program, etc.) may take the most up to date template and automatically populate project related data based on the project's metadata and the test planning conclusions provided by the rules which the project triggered.

An example of a deliverable document for which the wizard may be defined is the acceptance testing project strategy document. The wizard of this document may automatically populate and remove large sections of text according to the conclusions coming from rules. For example, the template of the testing strategy document may include sections for all testing types, based on a rule determining which testing types the project must include, the redundant sections and all references to the redundant types may be removed throughout the document by the wizard.

The manager may receive the document from the wizard with all impacted sections already enhanced, and may continue editing the document with a personal approach or customer specific business aspects for which no current rule was applicable.

Lessons learned during the project, related to deliverables, may be communicated back to the administrator who may constantly enhance both the wizard and the related rules.

The system 200 may also allow the test manager to grade a rule based on its contribution to the project. The test manager's feedback may impact both the selection of rules to take into account when building documents by software wizards, and the overall grade of the rule. In the case a low grade was provided to a rule, both its owner and the reviewing administrator may be alerted so they can adjust the rule and make sure it will give more accurate recommendations to subsequent projects.

Figure 3:
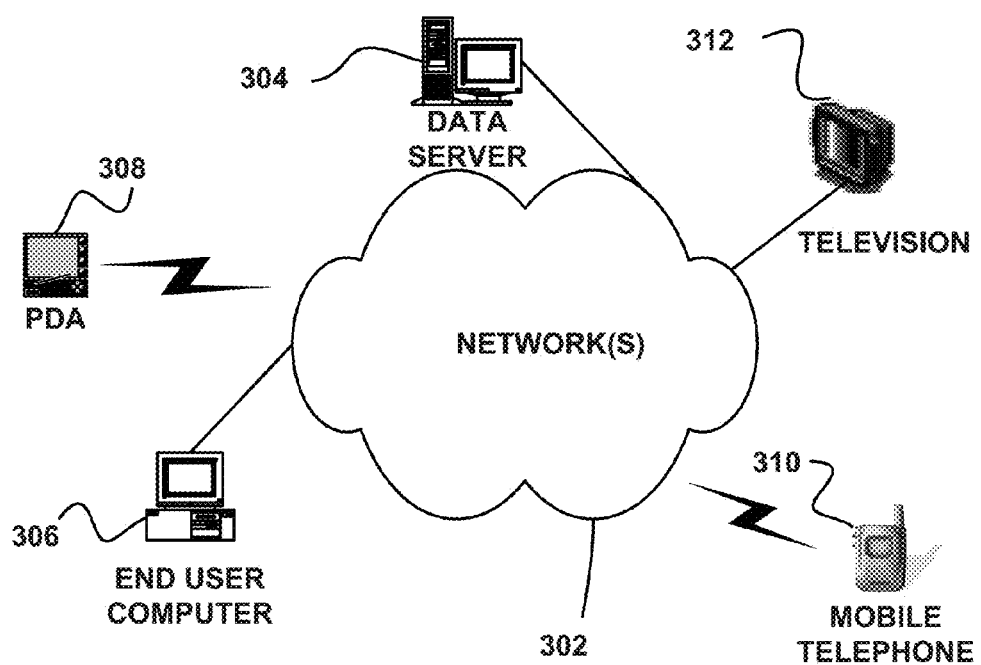
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
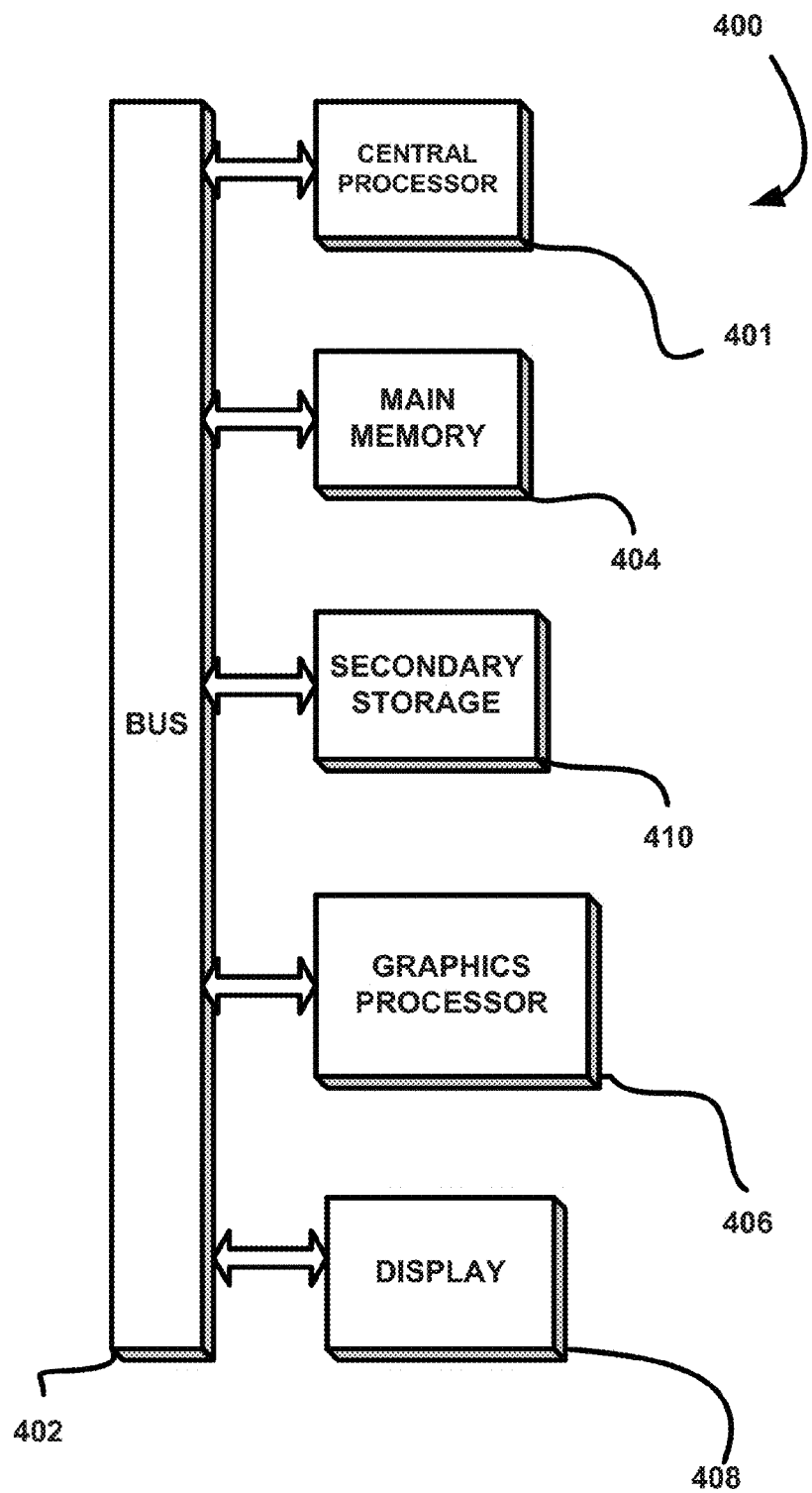
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation, Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for storing, in memory of a computer system, a plurality of test planning rules each defining: project attributes to which the rule is applicable, and one or more guidelines for generating a testing project having the project attributes;
   computer code for receiving, by the system from a user, metadata describing at least one testing project to be generated, the metadata including a plurality of project attributes of the at least one testing project;

computer code responsive to receiving the metadata for:
  (a) determining a subset of the plurality of test planning rules having project attributes that match the project attributes included in the received metadata,
  (b) determining, from the subset of the plurality of test planning rules, the one or more guidelines included therein, and
  (c) outputting the determined one or more guidelines utilizing a wizard for generating the at least one testing project, including for each step in a guided process:
    identifying which of the determined one or more guidelines are related to the step, and
    outputting the guidelines related to the step in a user interface of the wizard that is specific to the step; and computer code for identifying a change made to the received metadata; and computer code triggered in response to identifying the change made to the received metadata for repeating (a)-(c) for the changed metadata.

2. The computer program product of claim 1, further comprising computer code for defining a path of instructions to complete the at least one testing project.

3. The computer program product of claim 1, wherein the computer program product is operable such that the test planning rules include rules that are generated and constantly maintained based on best practices and lessons learned from a plurality of testing projects.

4. The computer program product of claim 1, further comprising computer code for utilizing the one or more guidelines included in the subset of the plurality of test planning rules to populate one or more deliverable documents with specific information for the at least one testing project.

5. The computer program product of claim 4, wherein the computer program product is operable such that the one or more deliverable documents are associated with at least one of a strategy of the at least one testing project, resources associated with the at least one testing project, and an overall project plan of the at least one testing project.

6. The computer program product of claim 1, wherein the computer program product is operable such that the plurality of project attributes of the at least one testing project that are included in the metadata include one or more of a project type, a testing methodology, a testing start date, a production date, a customer region, a main language, and a prime vendor.

7. The computer program product of claim 1, wherein the computer program product is operable such that the plurality of project attributes of the at least one testing project that are included in the metadata are received by user input to at least one user interface.

8. The computer program product of claim 1, wherein the computer program product is operable such that the one or more guidelines included in the subset of the plurality of test planning rules include an indication of a number of test environments required for the at least one testing project.

9. The computer program product of claim 1, wherein the computer program product is operable such that the one or more guidelines included in the subset of the plurality of test planning rules include an indication of an amount of effort that should be allocated to test design of the at least one testing project.

10. The computer program product of claim 1, wherein the computer program product is operable such that the one or more guidelines included in the subset of the plurality of test planning rules include an indication of how quickly to ramp up testers and a number of ramp up steps associated with the at least one testing project.

11. The computer program product of claim 1, wherein the computer program product is operable such that the one or more guidelines included in the subset of the plurality of test planning rules include an indication of testing types that the at least one testing project must include.

12. A method, comprising:
  storing, in memory of a computer system, a plurality of test planning rules each defining:
    project attributes to which the rule is applicable, and
    one or more guidelines for generating a testing project having the project attributes;
  receiving, by the system from a user, metadata describing at least one testing project to be generated, the metadata including a plurality of project attributes of the at least one testing project;
  responsive to receiving the metadata:
    (a) determining a subset of the plurality of test planning rules having project attributes that match the project attributes included in the received metadata,
    (b) determining, from the subset of the plurality of test planning rules, the one or more guidelines included therein, and
    (c) outputting the determined one or more guidelines utilizing a wizard for generating the at least one testing project, including for each step in a guided process:
      identifying which of the determined one or more guidelines are related to the step, and
      outputting the guidelines related to the step in a user interface of the wizard that is specific to the step; and
  identifying a change made to the received metadata; and
  in response to identifying the change made to the received metadata, repeating (a)-(c) for the changed metadata.

13. A system comprising:
  a memory; and
  one or more processing cores coupled to the memory that are each configured to:
  store, in the memory of the system, a plurality of test planning rules each defining:
    project attributes to which the rule is applicable, and
    one or more guidelines for generating a testing project having the project attributes;
  receive, by the system from a user, metadata describing at least one testing project to be generated, the metadata including a plurality of project attributes of the at least one testing project;
  responsive to receiving the metadata:
    (a) determine a subset of the plurality of test planning rules having project attributes that match the project attributes included in the received metadata,
    (b) determine, from the subset of the plurality of test planning rules, the one or more guidelines included therein, and
    (c) output the determined one or more guidelines utilizing a wizard for generating the at least one testing project, including for each step in a guided process:
      identifying which of the determined one or more guidelines are related to the step, and outputting the guidelines related to the step in a user interface of the wizard that is specific to the step; and computer code for identifying a change made to the received metadata; and computer code triggered in response to identifying the change made to the received metadata for repeating (a)-(c) for the changed metadata.

* * * * *